UNITED STATES PATENT OFFICE.

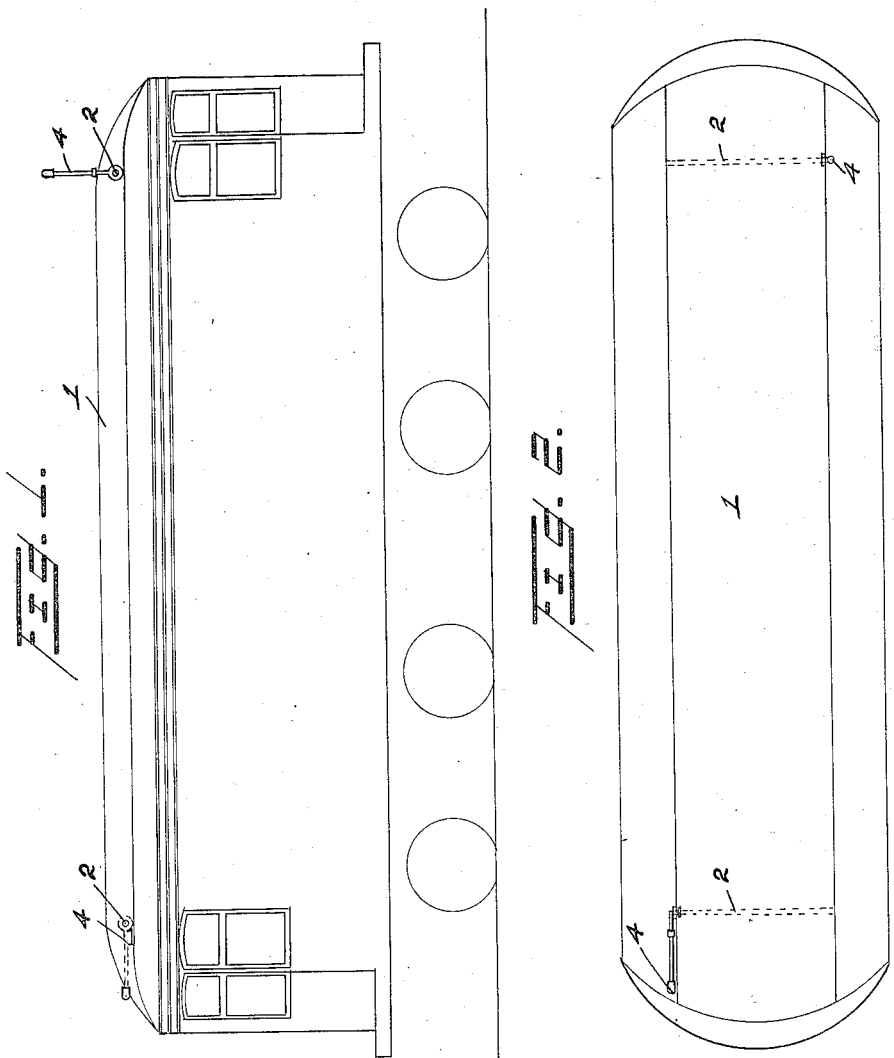

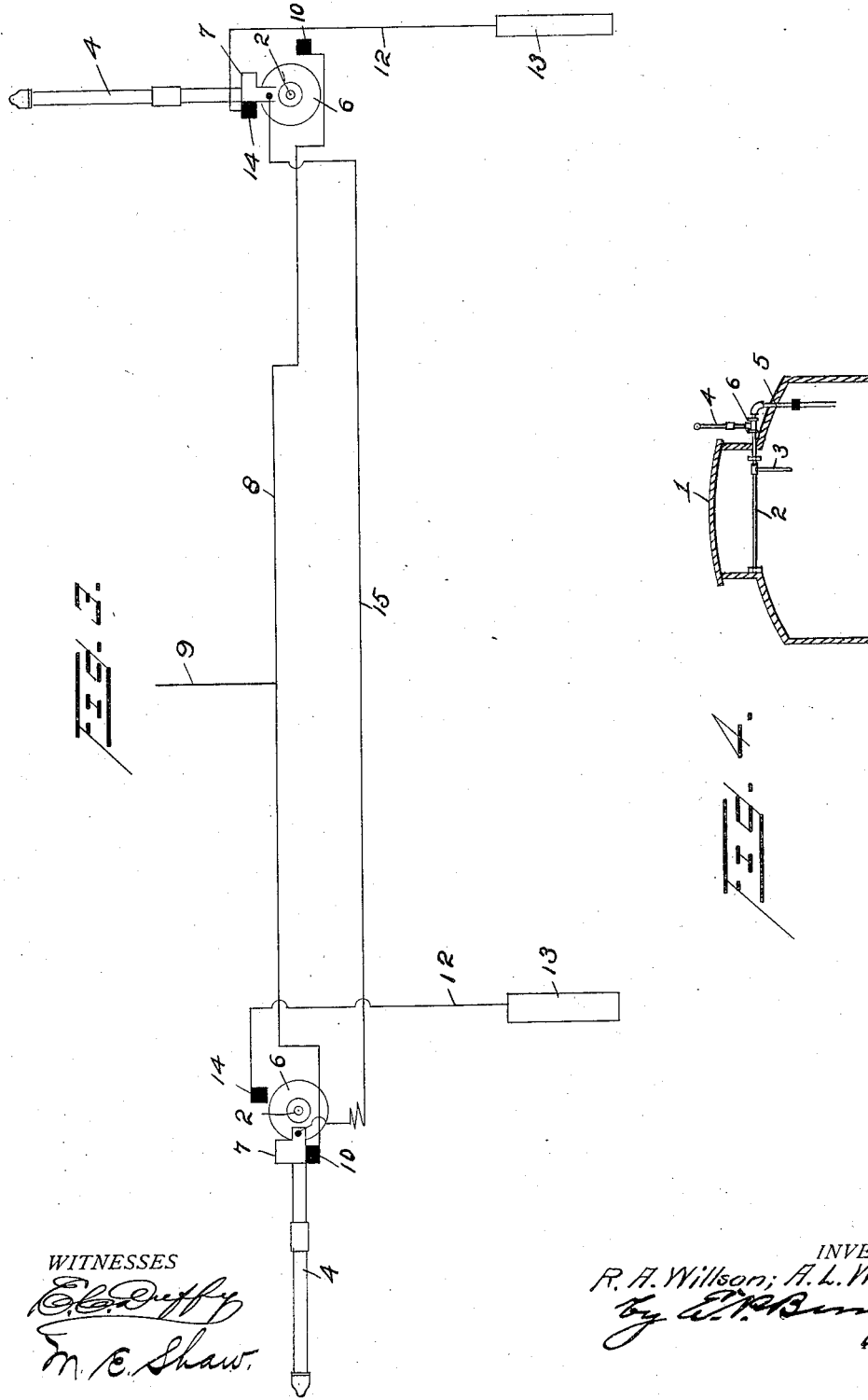

RUSSELL A. WILLSON AND ABBOTT L. WRIGHT, OF SPOKANE, WASHINGTON.

AUTOMATIC CAR-ARRESTER.

1,083,717.  Specification of Letters Patent.  Patented Jan. 6, 1914.

Application filed September 11, 1912.  Serial No. 719,721.

*To all whom it may concern:*

Be it known that we, RUSSELL A. WILLSON and ABBOTT L. WRIGHT, citizens of the United States of America, residing at Spokane, in the county of Spokane and State of Washington, have invented certain new and useful Improvements in Automatic Car-Arresters, of which the following is a specification.

This invention relates to automatic car arresters designed more particularly for use on double ended electrical interurban, street cars or other vehicles propelled either by electricity or other motive power where the car is not turned at the end of the line, and one of the principal objects of the invention is to provide simple, reliable and efficient means for bringing the car or trains of cars to a stop at a block signal set at danger, or, at a manually operated signal set by the station agent or other person in authority desirous to stop the train without notifying the motorman.

Another object of the invention is to provide means whereby the air brakes of the car or train will be set automatically whenever, for any reason, the train has over-run a block signal, or manually operated signal, when the motorman has failed to observe or heed the same.

In our patent dated December 19th, 1911, and numbered 1,012,493, we have shown and described a semaphore signal and a breaker arm connected thereto, said breaker arm being adapted to be thrown in a horizontal position for breaking a glass tube disposed in a vertical position on the car or locomotive in the path of the breaker arm, said glass tube being connected to the air braking system of the train disposed upon the locomotive or motor car. Our present invention may be used in connection with the breaker arm or semaphore referred to in said patent.

The objects herein referred to may be attained by means of the construction illustrated in the accompanying drawings, in which:

Figure 1 is a side elevation of a double ended electrically operable car, showing our arrester in operative position thereon. Fig. 2 is a top plan view of the same. Fig. 3 is a diagrammatic view of the electrical connections. Fig. 4 is a transverse, vertical, sectional view through the upper portion of one end of the car.

Referring to the drawings the numeral 1 designates the roof of a double end electrically operated car. Journaled within the top of the car at each end thereof is a shaft 2, and connected to each of said shafts within the car is a lever 3. Rigidly connected to each of said shafts outside the car and at one side of the roof 1 is a tube 4 and connected to said tube is a pipe 5 leading to the air brake system of the car. The tube 4 may be of glass if used on a car having an air brake system, and is designed to be thrown up in vertical position on the front of the car in the path of a breaker arm or semaphore, said glass tube adapted to be broken to set the brakes by letting out the air through the broken tube from the air brake system. If for any reason the station agent or other person in authority desires to stop the train or car without notifying the motorman, the breaker arm referred to in our patent may be thrown into horizontal position in the path of the tube.

Connected to a disk 6 rigidly fixed to each of the shafts 2 is a switch plate 7, as shown in Fig. 3. An electrical connection 8 to the trolley pole 9 is provided with a contact point 10 at one end and a similar contact point 10 at the opposite end, and when one of the tubes 4 is in a vertical position, the other is in a horizontal position. The connection 12 leading to the controller 13 at each end of the car is provided with a contact point 14, and connected to each of the switch plates 7 is a connection 15.

From the foregoing it will be obvious that the switch on tube 4 on the front of the car being in a vertical position will be connected with the controller 13, while the switch on tube at the rear end of the car will be in a horizontal position connected with the trolley line, but disconnected from the controller at that end of the car. The switch connected to tube 4 can either be arranged to connect direct to trolley lines or used in connection with a master controller circuit of multiple unit on contact circuits.

We claim:—

1. A car arrester comprising a shaft mounted transversely at each end near the top of the car, a tube connected to each of said shafts, said tubes communicating with the air brake system of the car, a controller, a switch plate connected to each of said shafts, an electrical connection between said switch plates, a contact point at each end of the car electrically connected with the trolley line wire, a contact point at each end of the car connected with the controller at the same end of the car, and means for rotating the shafts, the switch plate at one end of the car being connected with the controller contact point and disconnected from the trolley contact point at the same end when the corresponding tube is in a vertical position and the switch plate at the other end of the car being connected with the trolley contact point and disconnected from the controller contact point at the same end of the car.

2. A car arrester comprising a shaft at each end of the car, a tube connected to each of said shafts, said tubes communicating with the air brake system, a lever for rotating each of said shafts, a switch plate connected to each of said shafts, said switch plates being electrically connected, a contact point for each of said switch plates, electrically connected with the line wire, a contact point at each end of the car connected with the controller at the same end of the car, said switch plates adapted to be moved by rotation of the shafts, the switch plate at one end of the car being connected with the controller contact point and disconnected from the trolley contact point at the same end when the corresponding tube is in a vertical position and the switch plate at the other end of the car being connected with the trolley contact point and disconnected from the controller contact point at the same end of the car.

In testimony whereof we affix our signatures in presence of two witnesses.

RUSSELL A. WILLSON.
ABBOTT L. WRIGHT.

Witnesses:
 A. J. SCHULTHESS,
 C. J. MORROW.

---

Copies of this patent may be obtained for five cents each, by addressing the "Commissioner of Patents, Washington, D. C."